United States Patent
Wang et al.

(10) Patent No.: US 10,748,524 B2
(45) Date of Patent: Aug. 18, 2020

(54) SPEECH WAKEUP METHOD, APPARATUS, AND ELECTRONIC DEVICE

(71) Applicant: Alibaba Group Holding Limited, George Town, Grand Cayman (KY)

(72) Inventors: Zhiming Wang, Zhejiang (CN); Jun Zhou, Zhejiang (CN); Xiaolong Li, Zhejiang (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/774,422

(22) Filed: Jan. 28, 2020

(65) Prior Publication Data
US 2020/0168207 A1 May 28, 2020

Related U.S. Application Data

(63) Continuation of application No. 16/571,468, filed on Sep. 16, 2019, which is a continuation of application No. PCT/CN2018/092899, filed on Jun. 26, 2018.

(30) Foreign Application Priority Data

Jun. 29, 2017 (CN) .......................... 2017 1 0514348

(51) Int. Cl.
*G10L 15/06* (2013.01)
*G10L 15/16* (2006.01)
(Continued)

(52) U.S. Cl.
CPC .............. *G10L 15/063* (2013.01); *G06N 3/04* (2013.01); *G06N 3/08* (2013.01); *G10L 15/02* (2013.01);
(Continued)

(58) Field of Classification Search
CPC ........ G10L 15/063; G10L 15/16; G10L 15/22
See application file for complete search history.

(56) References Cited

U.S. PATENT DOCUMENTS 9,177,547 B2    11/2015   Kintzley et al.
10,229,672 B1*  3/2019    Rao .................... G10L 15/16
(Continued)

FOREIGN PATENT DOCUMENTS

CN    106098059 A    11/2016
CN    106297774 A    1/2017
(Continued)

OTHER PUBLICATIONS

Zhang, S., Zhang, C., You, Z., Zheng, R., & Xu, B. (May 2013). Asynchronous stochastic gradient descent for DNN training. In 2013 IEEE International Conference on Acoustics, Speech and Signal Processing (pp. 6660-6663). IEEE.*

(Continued)

*Primary Examiner* — Bryan S Blankenagel
(74) *Attorney, Agent, or Firm* — Finnegan, Henderson, Farabow, Garrett & Dunner, L.L.P.

(57) ABSTRACT

A speech wakeup method, apparatus, and electronic device are disclosed in embodiments of this specification. The method includes: inputting speech data to a speech wakeup model trained with general speech data; and outputting, by the speech wakeup model, a result for determining whether to execute speech wakeup, wherein the speech wakeup model includes a Deep Neural Network (DNN) and a Connectionist Temporal Classifier (CTC).

11 Claims, 8 Drawing Sheets

(51) Int. Cl.
*G10L 15/22* (2006.01)
*G06N 3/04* (2006.01)
*G06N 3/08* (2006.01)
*G10L 15/02* (2006.01)
*G10L 15/08* (2006.01)

(52) U.S. Cl.
CPC .............. *G10L 15/16* (2013.01); *G10L 15/22* (2013.01); *G10L 2015/025* (2013.01); *G10L 2015/088* (2013.01); *G10L 2015/223* (2013.01)

(56) References Cited

U.S. PATENT DOCUMENTS

2016/0099010 A1* 4/2016 Sainath ............... G06N 3/0445
704/232
2018/0336886 A1* 11/2018 Sun ........................ G10L 15/16

FOREIGN PATENT DOCUMENTS

| CN | 106611597 A | 5/2017 |
| CN | 106782536 A | 5/2017 |

OTHER PUBLICATIONS

Extended European Search Report for European Application No. 18823086.6 from the European Patent Office, dated Jan. 28, 2020.
Hori, Takaaki et al., "*Advances in Joint CTC-Attention based End-to-End Speech Recognition with a Deep CNN Encoder and RNN-LM*", Mitsubishi Electric Research Laboratories; Massachusetts Institute of Technology; Carnegie Mellon University, Jun. 8, 2017, 5pgs.
Tian, Xu, et al., "*Frame Stacking and Retaining for Recurrent Neural Network Acoustic Model*", Alibaba Shenma Search, Beijing, China, May 17, 2017, 5 pgs.
Zhang, Shilei, et al., "*Wake-up-Word Spotting Using End-to-End Deep Neural Network System* ", 23$^{rd}$ International Conference on Pattern Recognition (ICPR), Dec. 4-8, 2016, pp. 2878-2883.
Zhang, Zewang, et al., "*Deep Recurrent Convolutional Neural Network: Improving Performance for Speech Recognition*", IEEE, Dec. 27, 2016, 11 pgs.
Wang, Zhiming, et al., "*Small-Footprint Keyword Spotting Using Deep Neural Network and Connectionist Temporal Classifier*", AI Department, Ant Financial Group, Hangzhou, China, Sep. 12, 2017, 6 pgs.
International Search Report dated Oct. 8, 2018, in counterpart International Application No. PCT/CN2018/092899.
Bai, Ye, et al., *End-to-end Keywords Spotting Based on Connectionist Temporal Classification for Mandarin*, 2016 10$^{th}$ International Symposium on Chinese Spoken Language Processing (ISCSLP), Dec. 31, 2016, 5 pgs.
Chen, Guoguo, et al., *Small-Footprint Keyword Spotting Using Deep Neural Networks*, 2014 IEEE International Conference on Acoustics, Speech and Signal Processing (ICASSP), Dec. 30, 2014, 5 pgs.
Tao, Cheng, et al., *Behind the seven mainstream acoustic modeling technologies, how can the accuracy of speech recognition be further improved*, dated Sep. 7, 2016, retrieved from https://www.ednchina.com/news/201609070801.html, 9 pgs.

* cited by examiner

SPEECH WAKEUP METHOD, APPARATUS, AND ELECTRONIC DEVICE

CROSS-REFERENCE TO RELATED APPLICATIONS

This application is a continuation application of U.S. application Ser. No. 16/571,468, filed on Sep. 16, 2019, which is a continuation application of International Application No. PCT/CN2018/092899, filed on Jun. 26, 2018, which is based upon and claims priority to Chinese Patent Application No. 201710514348.6, filed on Jun. 29, 2017, the entire content of all of which is incorporated herein by reference.

TECHNICAL FIELD

This specification relates to the field of computer technologies, and in particular, to a speech wakeup method, apparatus, and electronic device.

TECHNICAL BACKGROUND

With the rapid development of mobile devices, speech-related technologies are also becoming increasingly common. For example, speech recognition is used in increasingly popular conversational assistants like Apple's Siri, Microsoft's Cortana, and Amazon's Alexa to enhance user experience and natural human-computer interaction level.

An important speech interaction technology is Keyword Spotting (KWS), which may also be generally referred to as speech wakeup or speech recognition. Based on the prior art, there is a need for a speech wakeup solution that may not rely on keyword-specific speech data.

SUMMARY

A speech wakeup method, apparatus, and electronic device are provided in embodiments of this specification, for solving the following technical problem: there is a need for a speech wakeup solution that may not rely on keyword-specific speech data.

According to one aspect, a speech wakeup method comprises: inputting speech data to a speech wakeup model trained with general speech data, and outputting, by the speech wakeup model, a result for determining whether to execute speech wakeup, wherein the speech wakeup model includes a Deep Neural Network (DNN) and a Connectionist Temporal Classifier (CTC).

According to one aspect, an electronic device comprises: at least one processor; and a memory communicatively connected to the at least one processor; wherein the memory stores an instruction executable by the at least one processor, and the instruction is executed by the at least one processor to cause the electronic device to: input speech data to a speech wakeup model trained with general speech data, and output from the speech wakeup model a result for determining whether to execute speech wakeup, wherein the speech wakeup model includes a DNN and a CTC.

According to one aspect, a non-transitory computer-readable storage medium has stored therein instructions that, when executed by a processor of an electronic device, cause the electronic device to perform a speech wakeup method, the method comprising: inputting speech data to a speech wakeup model trained with general speech data, and outputting, by the speech wakeup model, a result for determining whether to execute speech wakeup, wherein the speech wakeup model includes a DNN and a CTC.

At least one of the foregoing technical solutions adopted in the embodiments of this specification can achieve the following beneficial effects: instead of relying on keyword-specific speech data, the speech wakeup model may be trained with accessible general speech data, and then the trained speech wakeup model can be used for speech wakeup, which is conducive to improving the accuracy of speech wakeup.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

A speech wakeup method, apparatus, and electronic device are provided in embodiments of this specification.

The technical solutions in the embodiments of this specification will be clearly and completely described in the following with reference to the accompanying drawings. The embodiments described are merely exemplary, rather than all, of the embodiments of this application. All other embodiments obtained by those of ordinary skill in the art based on the embodiments of this specification without creative efforts should all fall within the protection scope of this application.

In the embodiments described below, a speech wakeup model including a Deep Neural Network (DNN) and a Connectionist Temporal Classifier (CTC) is trained with general speech data. The trained speech wakeup model can be used for speech wakeup and support user-defined keywords triggered by speech wakeup. Further, the speech wakeup model can be used in low-power devices such as mobile phones and home appliances, because the DNN included in the speech wakeup model can be relatively not too complicated, and for example, can only have three or four layers with two or three hundred nodes in each layer. The speech wakeup model can be referred to as CTC-KWS.

In the embodiments, the DNN is a multi-layer perceptron, which has one or more hidden layers between an input layer and an output layer and can simulate complex nonlinear relationships. The CTC is a classifier configured to perform a label tagging task, and does not require forced alignment between input and output.

Figure 1:
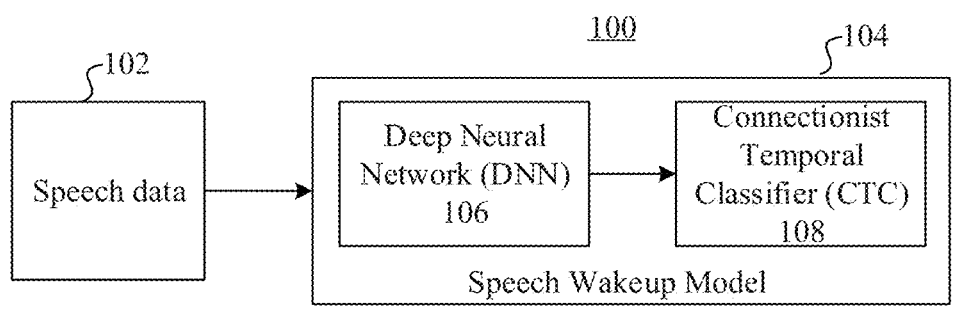
FIG. 1 is a schematic diagram of an overall architecture for speech wakeup, according to an embodiment.

FIG. 1 is a schematic diagram of an overall architecture 100 for speech wakeup, according to an embodiment. The overall architecture 100 includes speech data 102 as a first part and a speech wakeup model 104 as a second part. The speech wakeup model 104 includes a DNN 106 and a CTC 108. Speech wakeup can be implemented by inputting the speech data 102 to the speech wakeup model 104 for processing. The embodiments described in detail in the following are based on the overall architecture 100.

Figure 2:
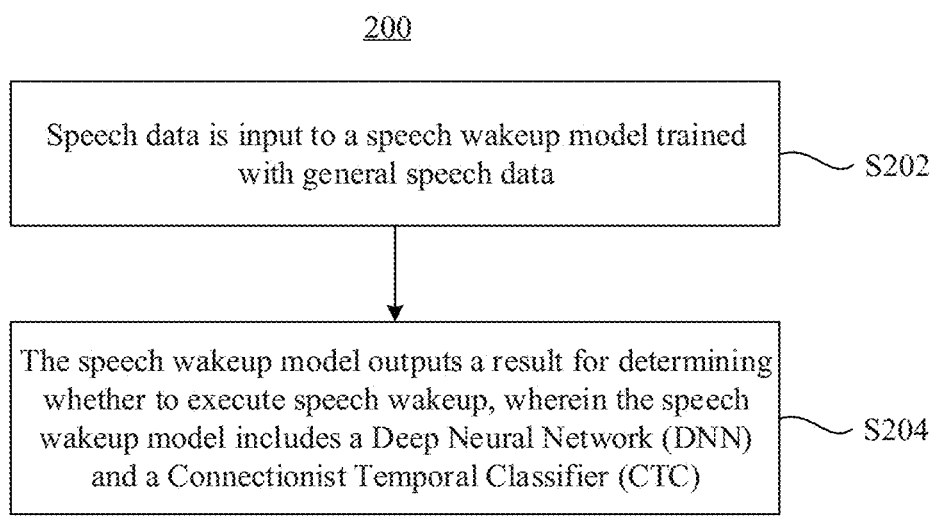
FIG. 2 is a flowchart of a speech wakeup method according to an embodiment.

FIG. 2 is a flowchart of a speech wakeup method 200 according to an embodiment. For example, the method 200 may be performed by a server or a terminal, for example, through a model training program, a speech recognition program, a speech wakeup application, and so on the server or the terminal. Also for example, the server or terminal may be a mobile phone, a tablet computer, a smart wearable device, an automobile machine, a personal computer, a medium-sized computer, a computer cluster, and so on. The method 200 may include the following steps.

In S202, speech data is input to a speech wakeup model trained with general speech data.

In the embodiment, speech can be monitored by the server or the terminal to obtain the speech data. When the speech is monitored, a user can speak out a predetermined keyword to trigger the speech wakeup model to execute speech wakeup.

In S204, the speech wakeup model outputs a result for determining whether to execute speech wakeup, wherein the speech wakeup model includes a DNN and a CTC.

In the embodiment, compared with the keyword-specific speech data mentioned in the Background, the general speech data described in step S202 is less restricted and, thus, easily accessible. For example, it may be a Large Vocabulary Continuous Speech Recognition (LVCSR) corpus or the like.

In the embodiment, the DNN included in the speech recognition model may predict a posterior probability distribution of a pronunciation phoneme sequence corresponding to input speech features. The DNN can be followed by the CTC to give a confidence score corresponding to the predicted pronunciation phoneme sequence. A result for determining whether to execute speech wakeup can be output based on the confidence score.

With the method 200, instead of relying on keyword-specific speech data, the speech wakeup model may be trained with the accessible general speech data, and further the trained speech wakeup model can be used for speech wakeup, which is conducive to improving the accuracy of speech wakeup.

The speech wakeup model also breaks through the restrictions of the keyword-specific speech data and supports user-defined triggered keywords. Therefore, it is more convenient and flexible in actual applications and conducive to improving user experience.

Based on the method 200, some specific implementations are further provided in the embodiments below.

Figure 3:
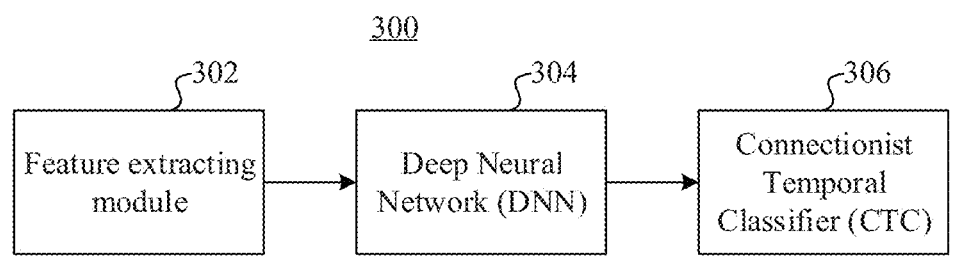
FIG. 3 is a schematic diagram of a speech wakeup model according to an embodiment.

FIG. 3 is a schematic diagram of a speech wakeup model 300, according to an embodiment. Referring to FIG. 3, the speech wakeup model 300 may include a feature extracting module 302, a DNN 304, and a CTC 306 in sequence. In step S204 of the method 200 (FIG. 2), the outputting, by the speech wakeup model, a result for determining whether to execute speech wakeup may include: the feature extracting module 302 extracting acoustic features from the input speech data; inputting the acoustic features to the DNN 304 for processing to obtain a class probability of the acoustic features respectively corresponding to each pronunciation phoneme; the DNN 304 inputting the class probability to the CTC 306 for processing to obtain a confidence score of a speech wakeup term corresponding to a pronunciation phoneme sequence; and the CTC 306 determining whether to execute wakeup according to the confidence score, and outputting a determination result.

The speech wakeup model 300 is described in detail below in further combination with FIG. 4, FIG. 5, and FIG. 6.

Figure 4:
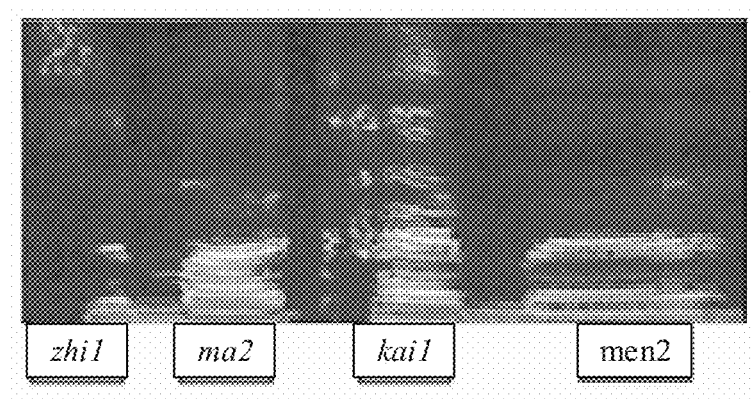
FIG. 4 is a schematic diagram of feature extraction performed by a feature extracting module according to an embodiment.

FIG. 4 is a schematic diagram of feature extraction performed by a feature extracting module, such as the feature extracting module 302 (FIG. 3), according to an embodiment.

In FIG. 4, when a section of speech "Zhi Ma Kai Men" is monitored at present, a target label sequence corresponding thereto is a pronunciation phoneme sequence, which can be expressed as: "zhi1ma2kai1men2", wherein the numbers represent tones. In addition to phonemes such as initials and finals, tone phonemes are also taken into account as a modeling unit. In an embodiment, context-independent or context-dependent phonemes can all be taken into account, among which the latter is more numerous. However, in consideration of reducing subsequent computational burden of the DNN, only the context-independent phonemes may be considered, such as 72 context-independent phoneme units in Chinese, including a blank unit.

In an embodiment, acoustic features can be extracted by the feature extracting module from the input speech data, which may include: extracting acoustic feature frames of the input speech data from a window according to a specified time interval, wherein each of the acoustic feature frames may be multi-dimension log filter bank energies; stacking a plurality of adjacent acoustic feature frames respectively; taking the stacked acoustic feature frames respectively as acoustic features extracted from the general speech data; and further, the stacked acoustic feature frames can be used as inputs of the DNN respectively.

The log filter bank energies refer to energy signals extracted by a log filter bank, which can be expressed as a vector to facilitate model processing. The multi-dimension in the foregoing represents multiple dimensions of the vector.

For example, a specified length of a time window may be 25 milliseconds, each time window may move for 10 milliseconds, and the multi-dimension may be, for example, 40 dimensions. On a time axis of the speech data, milliseconds from 0 to 25 may be used as a window, and 40-dimension log filter bank energies are correspondingly extracted from the speech data to serve as a first acoustic feature frame; milliseconds from 10 to 35 can be used as a window, and 40-dimension log filter bank energies are correspondingly extracted from the speech data to serve as a second acoustic feature frame; and multiple acoustic feature frames can be extracted in the same way.

Further, stacking a plurality of adjacent acoustic feature frames may allow more information from a context of a current frame, which is conducive to improving the accuracy of subsequent prediction results. Following the above example, the current frame, the adjacent consecutive ten frames before the current frame, and the adjacent consecutive five frames after the current frame can be, for example, stacked to obtain a 640-dimension stacking feature for being inputted to the subsequent DNN. In addition, cepstral mean and variance normalization can be carried out on the dimensions of the stacking feature, and then backward input can be carried out.

It should be noted that the feature extracting manner and parameters adopted in the foregoing embodiment are only exemplary, and they can be adjusted as needed in actual applications.

Figure 5:
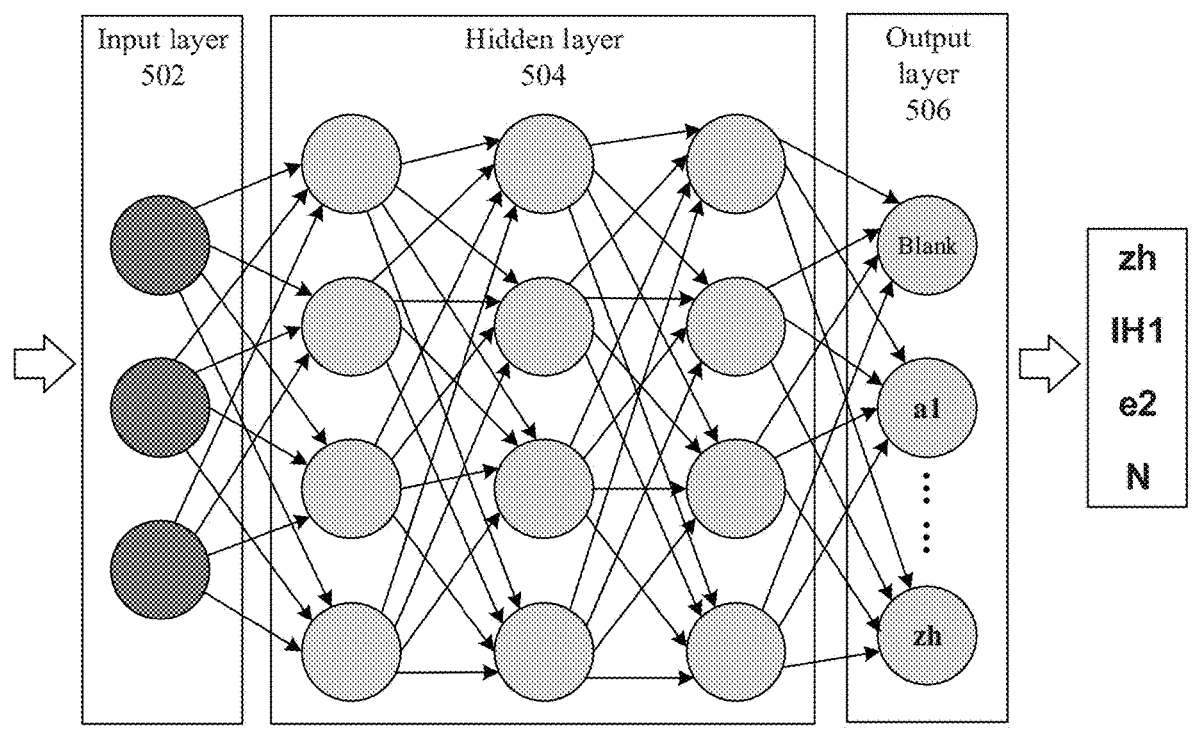
FIG. 5 is a schematic diagram of a Deep Neural Network (DNN) according to an embodiment.

FIG. 5 is a schematic diagram of a DNN, such as the DNN 304 (FIG. 3), according to an embodiment. Referring to FIG. 5, the DNN may include an input layer 502, one or more hidden layers 504, and an output layer 506.

In FIG. 5, various neurons, represented by circles, in the DNN are fully connected. The acoustic features extracted by the feature extracting module 302 (FIG. 3) are input to the DNN. The DNN can describe a relationship between an input acoustic feature $x_0 \in R^{n_0}$ in the input layer 502 and a modeling unit/in the output layer 506 according to the following function mapping:

$$z_i = x_{i-1} W_i^T + B_i, 1 \leq i \leq N + 1; \quad \text{(formula I)}$$

$$x_i = \sigma(z_i), 1 \leq i \leq N; \quad \text{(formula II)}$$

$$y_j = \frac{\exp(z_{N+1,j})}{\sum_k \exp(z_{N+1,k})}; \quad \text{(formula III)}$$

where $x_{i, i>0} \in R^{n_i}$ is an output of a hidden layer, $W_i \in R^{n_i \times n_{i-1}}$ and $B_i \in R^{n_i}$ are weights and offset parameters respectively, which may be predetermined based on, training or an application need, $n_i$ is the number of nodes on the $i^{th}$ layer, $\theta = \{W_i, B_i\}$, "T" denotes transpose of a matrix, N is the number of the hidden layers, and $\sigma$ is a nonlinear activation function, for example, a Rectified Linear Unit (ReLU) function $\sigma(z) = \max(z, 0)$. The formula III is a softmax function in the embodiment, representing an estimated posterior probability of a label unit j.

In an embodiment, a Recurrent Neural Network (RNN) can also be used in conjunction with the CTC. However, in the case where the training data is restricted such as in the Background, the minimum computing and power consumption requirements of mobile devices can be more easily met by using the DNN in conjunction with the CTC. In order to reduce the complexity in computation, the DNN with about hundreds of nodes in a hidden layer is more suitable.

Figure 6:
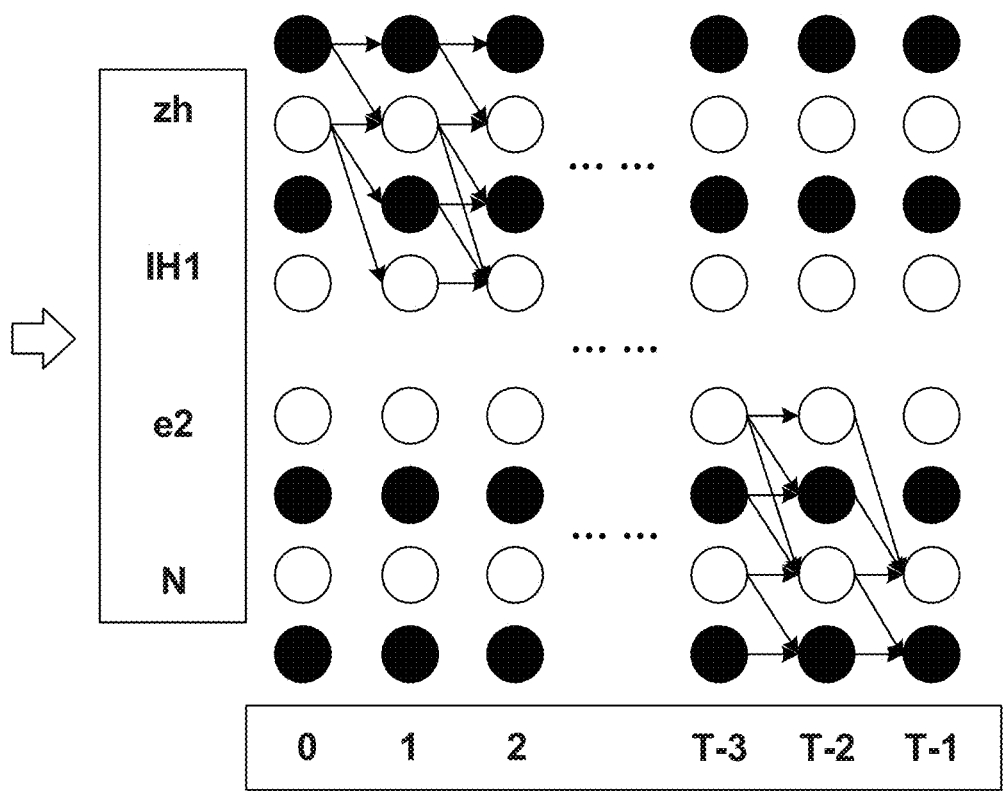
FIG. 6 is a schematic diagram of a Connectionist Temporal Classifier (CTC) according to an embodiment.

FIG. 6 is a schematic diagram of a CTC, such as the CTC 306 FIG. 3), according to an embodiment.

The CTC is configured for sequential label tasks. Unlike the cross-entropy criterion for the frame-level alignment between input features and target labels, the CTC is aimed to automatically learn the alignment between speech data and label sequences (e.g., phonemes or characters, etc.), thereby eliminating the need for forced alignment of data, and the input is not necessarily the same as the label length.

In FIG. 6, a specified modeling unit is extracted from L, and the CTC is located on a softmax layer of the DNN. The DNN is composed of an |L| unit and a blank unit. The introduction of the blank unit alleviates the burden of label prediction, as symbols are not output correspondingly during uncertainty.

In the embodiment, $y_j^t (j \in [0, |L|], t \in [0, T))$ is defined as a probability that the DNN outputs j in a time step t. An input sequence $x^T$ of a frame length T and a target label $l^{\leq T}$ are given, and $l_t \in L$. A CTC path $\pi = (\pi_0, \ldots, \pi_{T-1})$ is a frame-level label sequence, which is different from l in that the CTC path allows the appearance of repeated non-blank labels and blank units.

The CTC path $\pi$ can be mapped to its corresponding label sequence l by deleting the repeated labels and the blank units. For example, $\tau(\text{"aa-b-c"}) = \tau(\text{"abb-cc-"}) = \text{"abc"}$. A many-to-one mapping function is defined as $\tau$, and "-" represents blank. If $x^T$ is given, and an output probability condition of each time step is assumed to be independent, the probability of the path $\pi$ is:

$$p(\pi|x;\theta) = \Pi_{t=0}^{T-1} y_{\pi_t}^t; \quad \text{(formula IV)}$$

Then, the probability of the label sequence l can be calculated based on $\tau$ by summing the probabilities of all the paths mapped to l. In some embodiments, it may be troublesome to sum up all the paths on the CTC in terms of calculation. With respect to this problem, a forward and backward dynamic programming algorithm can be adopted. All possible CTC paths are represented compactly as grids based on the algorithm, as shown in FIG. 6.

At the time of training, the CTC is aimed to enable $\theta^* = \arg\min_\theta \Sigma_{x,l) \in S} -\log(p(l|x;\theta))$, where S represents training data used. At the time of decoding, when the confidence score output by the CTC, which may be expressed as $\log(p(l|x;\theta^*))$, is greater than a set threshold, a detection engine can make a positive decision accordingly, and it can be considered that corresponding keywords have been detected. The set threshold can be fine-tuned based on a verification data set.

In the embodiment, the model can be trained by a gradient descent method, such as an asynchronous random gradient descent method, to iteratively optimize parameters in the speech wakeup model until the training converges.

For example, the DNN and the CTC can be trained on a server having a Graphics Processing Unit (GPU). Network parameters are randomly initialized to be uniformly distributed within a range of (−0.02, 0.02), an initial learning rate is 0.008, and a momentum is 0.9.

The learning rate is a parameter used in the gradient descent method. In the gradient descent method, a solution may be initialized first, and on the basis of this solution, a moving direction and a moving step size are determined, so that after the initial solution moves according to the direction and the step size, the output of a target function can be reduced. Then it is updated to a new solution, a next moving direction and a next step size are searched continuously, and after this process is performed iteratively, the target function is constantly decreased, to finally find a solution, such that the target function is relatively small. In the process of finding the solution, if the step size is too large and the search is not careful enough, a good solution may be bypassed, and if the step size is too small, the process of finding the solution will proceed too slowly. Therefore, it is important to set the step size appropriately. The learning rate is used for the adjustment of the original step size. In the gradient descent method, the step size in each adjustment is equal to the learning rate multiplied by a gradient.

In the foregoing training, a verification data set may also be used to cross-verify the speech wakeup model to determine whether the training converges.

In order to improve the performance and robustness of the speech wakeup model, more measures are further provided in the solutions of this specification.

One measure is adaptive training. For example, a general model can be fine-tuned with speech data of some specific keywords and at a relatively low learning rate. Based on this consideration, when the speech wakeup model is trained, keyword-specific speech data can also be acquired, and the speech wakeup model can be trained with the keyword-specific speech data. A learning rate used in the training is less than that used in the training of the speech wakeup model with the general speech data.

Another measure is transfer learning. For example, the network parameters may not be randomly initialized, but refer to an existing corresponding network which has the same topology structure as the target network except for fine-grained units in the output layer, and may use a cross entropy criterion. The transfer learning can be considered especially when the training data has a large scale.

Other measures include, for example, using architecture-related vector instructions (e.g., ARM's NEON) to further accelerate multiplication, and so on.

As mentioned previously, the solution of this specification can easily support user-defined speech wakeup keywords. A target label sequence corresponding to such user-defined keywords can be determined through a dictionary.

A speech wakeup method provided in the embodiment of this specification is as described in e foregoing. A corresponding apparatus is further provided in an embodiment of this specification, as shown in FIG. 7.

Figure 7:
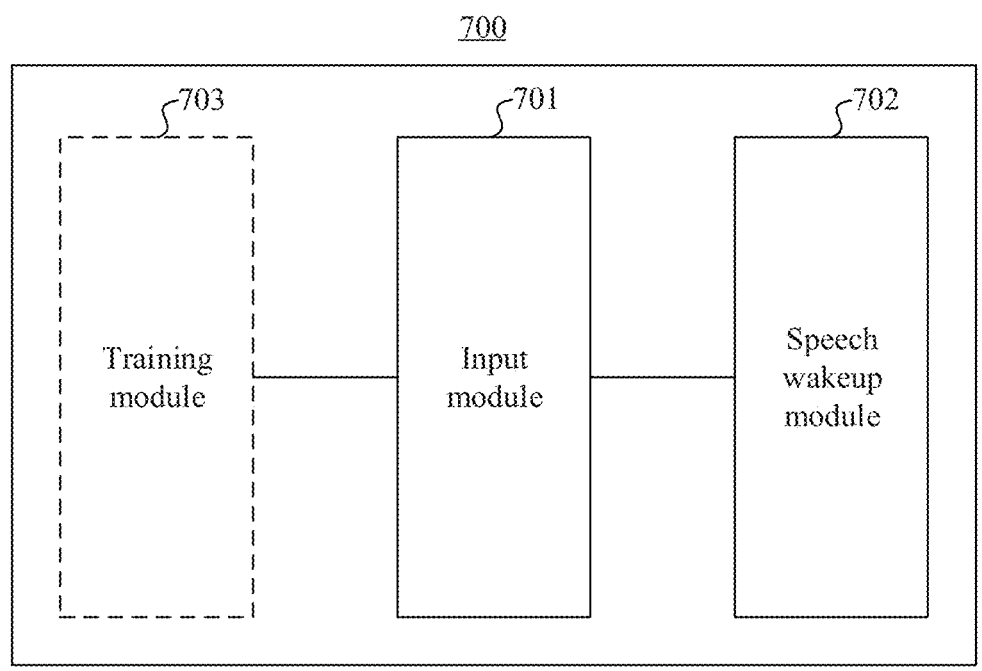
FIG. 7 is a schematic diagram of a speech wakeup apparatus according to an embodiment.

FIG. 7 is a schematic diagram of a speech wakeup apparatus 700, according to an embodiment. For example, the apparatus 700 corresponds to the method 200 (FIG. 2), and the dashed box in FIG. 7 represents an optional module. The apparatus 700 may include an input module 701 and a speech wakeup model 702.

Speech data is input by the input module 701 to the speech wakeup model 702 trained with general speech data, and the speech wakeup model 702 outputs a result for determining whether to execute speech wakeup, wherein the speech wakeup model includes a DNN and a CTC.

In an embodiment, the general speech data includes a LVCSR corpus.

In an embodiment, the apparatus further includes a training module 703; and training, by the training module 703, the speech wakeup model with the general speech data includes: iteratively optimizing, by the training module 703, parameters in the speech wakeup model with the general speech data by an asynchronous stochastic gradient descent method until the training converges.

In an embodiment, the training module 703 further acquires keyword-specific speech data; and trains the speech wakeup model with the keyword-specific speech data, wherein a learning rate used in the training is less than that used in the training of the speech wakeup model with the general speech data.

In an embodiment, the training module 703 cross-verifies the speech wakeup model with a verification data set in the training to determine whether the training converges.

In an embodiment, the outputting, by the speech wakeup model 702, a result for determining whether to execute speech wakeup specifically includes: extracting, by the speech wakeup model 702, acoustic features from the input speech data; inputting the acoustic features to the DNN included in the speech wakeup model 702 for processing to obtain a class probability of the acoustic features respectively corresponding to each pronunciation phoneme; inputting the class probability to the CTC included in the speech wakeup model 702 for processing to obtain a confidence score of a speech wakeup term corresponding to a pronunciation phoneme sequence; and determining whether to execute wakeup according to the confidence score, and outputting a determination result.

In an embodiment, the extracting, by the speech wakeup model 702, acoustic features from the input speech data specifically includes: extracting, by the speech wakeup model 702, acoustic feature frames of the input speech data from a window according to a specified time interval, wherein each of the acoustic feature frames is multi-dimension log filter bank energies; stacking a plurality of adjacent acoustic feature frames respectively; and taking the stacked acoustic feature frames respectively as acoustic features extracted from the monitored speech.

Figure 8:
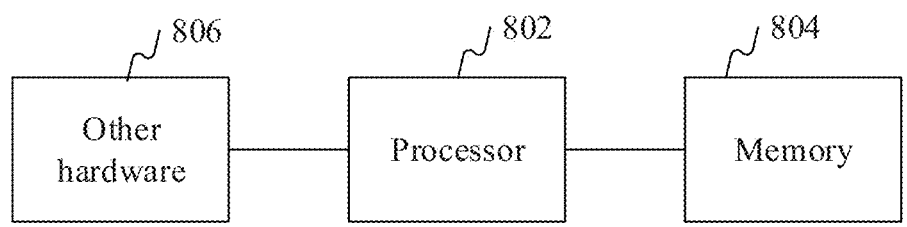
FIG. 8 is a schematic diagram of an electronic device according to an embodiment.

A corresponding electronic device is further provided in an embodiment of this specification, as shown FIG. 8.

FIG. 8 is a schematic diagram of an electronic device 800, according to an embodiment. For example, the electronic device 800 includes at least one processor 802; and a memory 804 communicatively connected to the at least one processor 802. The electronic device 800 may also include other hardware 806, such as a network interface. The at least one processor 802 may include one or more dedicated processing units, application-specific integrated circuits (ASICs), field-programmable gate arrays (FPGAs), or various other types of processors or processing units. The at least one processor 802 is coupled with e memory 804 and is configured to execute instructions stored in the memory 804 to perform the above described methods. The memory 804 may include a non-permanent memory, a random access memory (RAM) and/or a non-volatile memory (such as a read-only memory (ROM) or a flash memory (flash RAM)), etc.

The memory 804 stores an instruction executable by the at least one processor 802, and the instruction is executed by the at least one processor 802 to cause the electronic device 800 to: input speech data to a speech wakeup model trained with general speech data, and output, by the speech wakeup model, a result for determining whether o execute speech wakeup, wherein the speech wakeup model includes a DNN and a CTC.

A corresponding non-transitory computer storage medium with a computer executable instruction stored thereon is further provided in an embodiment of this specification. The computer executable instruction is configured to: input speech data to a speech wakeup model trained with general speech data, and output, by the speech wakeup model, a result for determining whether to execute speech wakeup, wherein the speech wakeup model includes a DNN and a CTC.

Specific embodiments of this specification have been described in the foregoing. Other embodiments fall within the scope of the appended claims. Under some circumstances, the actions or steps described in the claims may be performed in a sequence different from that in the embodiments and still can achieve a desired result. In addition, the processes depicted in the accompanying drawings are not necessarily required to achieve the desired result according to the specific sequence or consecutive sequence shown. Multitask processing and parallel processing are also possible or may be advantageous in some implementation manners.

The embodiments in the specification are described progressively, identical or similar parts of the embodiments may be obtained with reference to each other, and each embodiment emphasizes a part different from other embodiments. Especially, the apparatus, electronic device, and computer storage medium embodiments are similar to the method embodiments. For related parts, refer to the descriptions of the parts in the method embodiments.

The apparatus, the electronic device, and the computer storage medium provided in the embodiments of this specification are corresponding to the method. Therefore, the apparatus, the electronic device, and the non-volatile computer storage medium also have beneficial technical effects similar to those of the corresponding method. As the beneficial technical effects of the method have been described in detail in the foregoing, the beneficial technical effects of the apparatus, the electronic device, and the non-volatile computer storage medium will not be elaborated here.

Each of the above described methods, modules and models may be implemented as software, or hardware, or a combination of software and hardware. For example, a Programmable Logic Device (PLD) (e.g., a Field Programmable Gate Array (FPGA)) is an integrated circuit, and its logic functions are determined by a user programming device. Designers program by themselves to integrate a digital system into a PLD, without asking a chip manufacturer to design and manufacture a dedicated integrated circuit chip. Moreover, at present, the programming may be implemented by using logic compiler software instead of manually manufacturing an integrated circuit chip. The logic compiler software is similar to a software complier used for developing and writing a program, and original codes before compiling also need to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art should also know that a hardware circuit for implementing the logic method procedure can be easily obtained by slightly logically programming the method procedure using the above several hardware description languages and programming it into an integrated circuit.

A controller can be implemented in any suitable manner in the above described devices. For example, the controller can employ a form of a microprocessor or a processor and a computer-readable storage medium that stores computer-readable program codes (such as software or firmware) executable by the microprocessor or processor, a logic gate, a switch, an Application Specific integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The controller of the memory can further be implemented as a part of control logic of the memory. Those skilled in the art also know that in addition to implementing the controller by using pure computer-readable program codes, it is completely feasible to logically program the method steps to enable the controller to implement the same function in a form of a logic gate, a switch, an ASIC, a programmable logic controller, and an embedded microcontroller. Therefore, such a controller may be considered as a hardware component, and apparatuses included in the controller and configured to implement various functions may also be considered as structures inside the hardware component. Or, the apparatuses configured to implement various functions may even be considered as both software modules configured to implement the method and structures inside the hardware component.

The apparatuses, modules or models illustrated in the foregoing embodiments can be implemented by a computer chip or an entity, or implemented by a product having a specific function. A typical implementation device is a computer. For example, the computer can be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various units based on functions, and the units are described separately. In an implementation of this specification, the functions of various units can also be implemented in one or more pieces of software and/or hardware.

Those skilled in the art should understand that the above described embodiments can be provided as a method, a system, or a computer program product. Therefore, the embodiments may be implemented in a form of a complete hardware embodiment, a complete software embodiment, or an embodiment combining software and hardware. Moreover, the embodiments of this specification can be in the form of a computer program product implemented on one or more computer usable storage media (including, but not limited to, a magnetic disk memory, a CD-ROM, an optical memory and the like) including computer usable program codes.

The embodiments are described with reference to flowcharts and/or block diagrams of the method, the device and the computer program product according to the embodiments of this specification. It should be understood that computer program instructions may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor or a processor of another programmable data processing device to generate a machine, such that the computer or the processor of another programmable data processing device executes an instruction to generate an apparatus configured to implement functions designated in one or more processes in a flowchart and/or one or more blocks in a block diagram.

The computer program instructions may also be stored in a computer-readable memory that can guide the computer or another programmable data processing device to work in a specific manner, such that the instruction stored in the computer-readable memory generates an article of manufacture including an instruction apparatus, and the instruction apparatus implements functions designated by one or more processes in a flowchart and/or one or more blocks in a block diagram.

The computer program instructions may also be loaded to the computer or another programmable data processing device, such that a series of operation steps are executed on the computer or another programmable device to generate a computer implemented processing, and therefore, the instruction executed in the computer or another programmable device provides steps for implementing functions designated in one or more processes in a flowchart and/or one or more blocks in a block diagram.

The computer-readable storage medium includes non-volatile and volatile media as well as movable and non-movable media, and can implement information storage by means of any method or technology. The information can be a computer-readable instruction, a data structure, and a module of a program or other data. Examples of the computer-readable storage medium include, but are not limited to, a phase change memory (PRAM), a static random access memory (SRAM), a dynamic random access memory (DRAM), other types of RAM, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. The computer-readable storage medium does not include transitory media, such as a modulated data signal and a carrier.

It should be further rioted that the terms "include", "comprise" or any other variations thereof are intended to cover non-exclusive inclusion, so that a process, method, commodity or device including a series of elements not only includes the elements, but also includes other elements not expressly listed, or further includes elements inherent to the process, method, commodity or device. In the absence of more limitations, an element defined by "including a/an . . . " does not exclude that the process, method, commodity or device including the element further has other identical elements.

The embodiments can be described in a general context of a computer executable instruction executed by a computer, for example, a program module. Generally, the program module includes a routine, a program, an object, an assembly, a data structure, and the like used for executing a specific task or implementing a specific abstract data type. The embodiments can also be implemented in distributed computing environments. In these distributed computing environments, a task is executed by using remote processing devices connected via a communications network. In the distributed computing environments, the program module may located in local and remote computer storage media including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A speech wakeup method, comprising:
    training a speech wakeup model with general speech data, wherein the training includes: iteratively optimizing parameters in the speech wakeup model with the general speech data by means of an asynchronous stochastic gradient descent method until the training converges;
    acquiring keyword-specific speech data, and training the speech wakeup model with the keyword-specific speech data, wherein a learning rate used in the training with the keyword-specific speech data is less than that used in the training of the speech wakeup model with the general speech data;
    inputting speech data to the speech wakeup model trained with the general speech data and the keyword-specific speech data; and
    outputting, by the speech wakeup model, a result for determining whether to execute speech wakeup, wherein the speech wakeup model includes a Deep Neural Network (DNN) and a Connectionist Temporal Classifier (CTC).

2. The method of claim 1, wherein the general speech data comprises a Large Vocabulary Continuous Speech Recognition (LVCSR) corpus.

3. The method of claim 1, further comprising:
    cross-verifying the speech wakeup model with a verification data set in the training to determine whether the training converges.

4. The method of claim 1, wherein the outputting, by the speech wakeup model, a result for determining whether to execute speech wakeup comprises:
    extracting acoustic features from the input speech data;
    inputting the acoustic features to the DNN included in the speech wakeup model for processing to obtain a class probability of the acoustic features respectively corresponding to each pronunciation phoneme;
    inputting the class probability to the CTC included in the speech wakeup model for processing to obtain a confidence score of a speech wakeup term corresponding to a pronunciation phoneme sequence; and
    determining whether to execute speech wakeup according to the confidence score, and outputting a determination result.

5. The method of claim 4, wherein the extracting acoustic features from the input speech data comprises:
    extracting acoustic feature frames of the input speech data from a window according to a specified time interval, wherein each of the acoustic feature frames is multi-dimension log filter bank energies;
    stacking a plurality of adjacent acoustic feature frames respectively; and
    taking the stacked acoustic feature frames respectively as acoustic features extracted from the input speech data.

6. An electronic device, comprising:
    at least one processor; and
    a memory communicatively connected to the at least one processor;
    wherein the memory stores an instruction executable by the at least one processor, and the instruction is executed by the at least one processor to cause the electronic device to:
    train a speech wakeup model with general speech data, wherein the training includes: iteratively optimizing parameters in the speech wakeup model with the general speech data by means of an asynchronous stochastic gradient descent method until the training converges;
    acquire keyword-specific speech data, and train the speech wakeup model with the keyword-specific speech data, wherein a learning rate used in the training with the keyword-specific speech data is less than that used in the training of the speech wakeup model with the general speech data;
    input speech data to the speech wakeup model trained with the general speech data and the keyword-specific speech data; and
    output from the speech wakeup model a result for determining whether to execute speech wakeup, wherein the speech wakeup model includes a Deep Neural Network (DNN) and a Connectionist Temporal Classifier (CTC).

7. The electronic device of claim 6, wherein the general speech data comprises a large vocabulary continuous speech recognition (LVCSR) corpus.

8. The electronic device of claim 6, wherein the instruction is further executed by the at least one processor to cause the electronic device to: cross-verify the speech wakeup model with a verification data set in the training to determine whether the training converges.

9. The electronic device of claim 6, wherein in outputting from the speech wakeup model a result for determining whether to execute speech wakeup, the instruction is further executed by the at least one processor to cause the electronic device to:
    extract, by the speech wakeup model, acoustic features from the input speech data;

input the acoustic features to the DNN included in the speech wakeup model for processing to obtain a class probability of the acoustic features respectively corresponding to each pronunciation phoneme;

input the class probability to the CTC included in the speech wakeup model for processing to obtain a confidence score of a speech wakeup term corresponding to a pronunciation phoneme sequence; and determine whether to execute wakeup according to the confidence score, and output a determination result.

10. The electronic device of claim 9, wherein in extracting, by the speech wakeup model, acoustic features from the input speech data, the instruction is further executed by the at least one processor to cause the electronic device to:

extract, by the speech wakeup model, acoustic feature frames of the input speech data from a window according to a specified time interval, wherein each of the acoustic feature frames is multi-dimension log filter bank energies;

stack a plurality of adjacent acoustic feature frames respectively; and take the stacked acoustic feature frames respectively as acoustic features extracted from the input speech data.

11. A non-transitory computer-readable storage medium having stored therein instructions that, when executed by a processor of an electronic device, cause the electronic device to perform a speech wakeup method, the method comprising:

training a speech wakeup model with general speech data, wherein the training includes: iteratively optimizing parameters in the speech wakeup model with the general speech data by means of an asynchronous stochastic gradient descent method until the training converges;

acquiring keyword-specific speech data, and training the speech wakeup model with the keyword-specific speech data, wherein a learning rate used in the training with the keyword-specific speech data is less than that used in the training of the speech wakeup model with the general speech data;

inputting speech data to the speech wakeup model trained with the general speech data and the keyword-specific speech data; and outputting, by the speech wakeup model, a result for determining whether to execute speech wakeup, wherein the speech wakeup model includes a Deep Neural Network (DNN) and a Connectionist Temporal Classifier (CTC).

* * * * *